(No Model.)

D. H. HIBBERT.
CRAB TRAP.

No. 551,468. Patented Dec. 17, 1895.

Witnesses.
Jesse B. Heller
Frank S. Busser

Inventor.
Decatur H. Hibbert

Attorney.

UNITED STATES PATENT OFFICE.

DECATUR H. HIBBERT, OF MEDIA, PENNSYLVANIA.

CRAB-TRAP.

SPECIFICATION forming part of Letters Patent No. 551,468, dated December 17, 1895.

Application filed August 14, 1895. Serial No. 559,246. (No model.)

*To all whom it may concern:*

Be it known that I, DECATUR H. HIBBERT, a citizen of the United States, residing at Media, county of Delaware, and State of Pennsylvania, have invented a new and useful Improvement in Crab-Traps, of which the following is a full, clear, and exact description, reference being had to the accompanying drawings, which form a part of this specification.

My invention relates to fish-nets, particularly to that class of traps or nets which are used in "crabbing;" and it consists of a net having suspended above it a bait-hook, the hook being attached to the line and having a limited vertical movement independent of the net, to allow the manipulator to determine whether a crab has been baited.

It further consists of a bail suspended above the net with which the bait-hook is adapted to engage when the hook is drawn suddenly upward, the shock causing the crab to be dislodged and drop back into the net.

The construction and operation is more fully described below.

Figure 1:
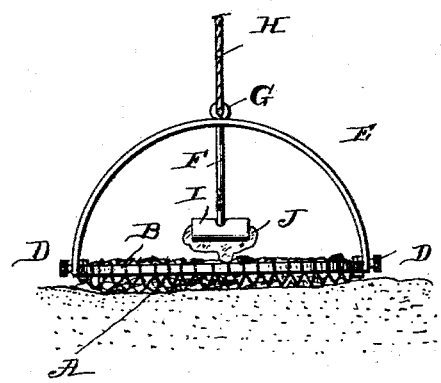
Figure 2:
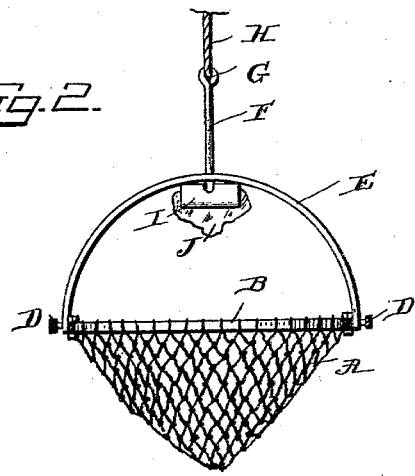
Figure 3:
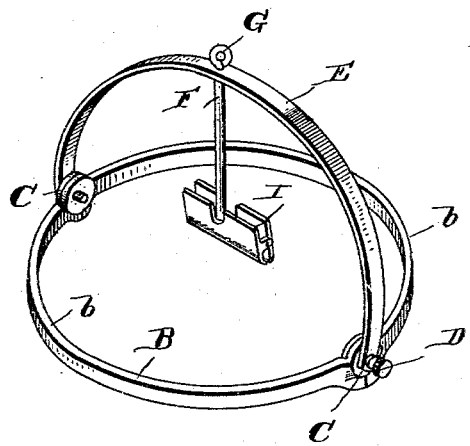

In the drawings, Figure 1 is a side view illustrating the trap and the position of the parts when the same is allowed to rest on the water-bottom. Fig. 2 illustrates the relative positions of the several parts when the trap is suspended above the ground, and Fig. 3 is a perspective view of the trap with the net omitted.

A is the net consisting of netted cord or thread adapted to fold within itself into a flat mass when the trap is allowed to rest on the water-bed, as illustrated in Fig. 1. The net is suspended in a suitable manner upon a support, preferably the ring B. This ring B may be made in a single piece, but, for convenience in carrying, I prefer to make it in two semicircular parts $b$ $b$, the parts being suitably hinged so that they may be folded together. The hinge C C illustrated is that used on the ordinary carpenter's or pocket rule. Instead of a rivet I use a screw or a bolt and nut D, the same passing through the overlapping parts of the semi-rings and also through the ends of a bail E, which is suspended above the rings when the trap is in use. By loosening the nut the semi-rings and the bail may be folded together, but when the several parts are unfolded into their operative position, the bolt is tightened and the parts held rigidly.

The rod F, carrying the bait-holder I, is connected to the bail and ring by a loose connection. By a loose connection I mean one which will permit the bait-holder to have a limited movement independent of the net-support, while a further movement of the bait-holder will carry the net-support with it. The particular form of loose connection which I have adopted is of the following construction: In the center of the bail is an orifice through which extends the rod F, having at its upper end an eye G, to which the end of the line H is fastened, and having at its lower end the bait-holder I. The rod F can be drawn up through the orifice, without carrying with it the net and its support, until the bait-holder engages the bail, whereupon the several parts of the device must move together.

I do not restrict myself to the particular type of loose connection between the bait-holder and net-support just described, except wherein I particularly claim it, as any other form of loose connection that may be found suitable is within my invention.

The bait-holder is preferably a snap-hook, as illustrated, but the bait may be secured to the rod in any desired manner. J in Figs. 1 and 2 represents the bait.

The trap is manipulated as follows: The parts being unfolded into the position shown in the figures, the trap is allowed to sink through the water to the water-bed, when the net will assume the position shown in Fig. 1 and the bait J and rod F will drop until the eye G reaches the orifice in the bail. From time to time the line is pulled gently and when the presence of a crab is detected, the line is gently relaxed and then with a sudden jerk pulled upward, and the trap drawn quickly up through the water. The sudden engagement of the bait-holder with the bait causes the crab to relax its hold and be dislodged from the bait, and it falls into the net, which by this time has been raised above the water-bottom and has assumed the position shown in Fig. 2. The trap may then be drawn out of the water at any desired speed, as the crab cannot possibly escape.

The details of construction may be changed without departing from my invention, and I do not restrict myself to the particular construction described and illustrated, except wherein I particularly claim it; nor do I wish it to be understood that the invention is applicable only to the purpose of trapping crabs, as it is also suitable for catching fish. When used for the latter purpose, the bait-holder normally rests in its uppermost position, so that a bite can be detected by the fish pulling on the rope. It is necessary that the bait-holder should have a limited movement independent of the net and its support for several reasons: first, in order that the fish may bite without pulling on the whole apparatus, agitating the water, and causing the fish to escape, and secondly, when the net rests upon the water-bottom, if the bait-holder were not independently movable, a bite could not be detected. When a fish bites, the net is pulled up suddenly, and the fish, in attempting to escape, dives under (never over) the upwardly moving ring and finds itself caught in the net. The extent of the limited independent movement of the bait-holder and the distance of the bait-holder from the ring in its upper and lower positions may be varied as circumstances require.

Having now fully described my invention, what I claim, and desire to protect by Letters Patent, is—

1. The combination with a net, of a ring for supporting the same, a bait-holder adapted to be suspended from a line, and means attached to said ring and limiting the upward movement of the bait-holder.

2. The combination with a net, of a ring for supporting the same, a bait-holder adapted to be suspended from a line, and means attached to said ring and limiting the downward movement of the bait-holder.

3. The combination with a net, of a ring for supporting the same, a bait-holder adapted to be suspended from a line, and means attached to said ring and limiting the up and down movements of the bait-holder.

4. The combination with a net, of a ring for supporting the same, a bail secured to the ring, a bait-holder, a rod, secured to the bait-holder, extending through the bail, and having an enlarged portion limiting the descent of the rod.

5. The combination with a net, of a ring for supporting the same made in two parts and hinged together, a bail pivoted at the hinged portions of the rings, means for tightening the connection between said semi-rings and the bail at the hinge joint, and a bait-holder adapted to be suspended by a device extending through said bail.

6. In a crab trap, the net A, semi-rings b b, bail E, said semi-rings and bail being pivotally secured together substantially as described, a tightening device for making the said pivotal connection rigid, rod F, a bait-holder, and means attached to said ring and limiting the downward movement of said rod.

7. The combination with a net, of a support for the same, a bait-holder, and a loose connection between the bait-holder and net-support to permit the bait-holder to have a limited movement independent of the net-support.

In testimony of which invention I have hereunto set my hand.

DECATUR H. HIBBERT.

Witnesses:
CHAS. E. KING, Jr.,
PHILIP BOUTELJE.